United States Patent [19]
Wasco et al.

[11] 3,904,474
[45] Sept. 9, 1975

[54] APPARATUS FOR ULTRASONIC SPLICING

[75] Inventors: Walter C. Wasco; Charles W. Pierson, both of Rochester; Leonard E. Pagnard, Hilton, all of N.Y.

[73] Assignee: Eastman Kodak Company, Rochester, N.Y.

[22] Filed: Oct. 16, 1972

[21] Appl. No.: 298,103

Related U.S. Application Data
[62] Division of Ser. No. 126,091, March 19, 1971, Pat. No. 3,728,183.

[52] U.S. Cl. .................... 156/581; 29/470.3; 228/1
[51] Int. Cl.² ...................... B01J 1/12; B30B 12/00
[58] Field of Search ............. 156/580, 73, 513, 574, 156/581, 380, 507, 502, 73.1, 73.6, 73.2, 73.4; 228/1, 470; 29/470.3

[56]           References Cited
           UNITED STATES PATENTS

| | | | |
|---|---|---|---|
| 3,131,104 | 4/1964 | Korn | 156/73 |
| 3,440,117 | 4/1969 | Soloff et al. | 156/73 |
| 3,562,041 | 2/1971 | Robertson | 156/73 |
| 3,565,732 | 2/1971 | Colianni | 156/513 |
| 3,612,385 | 10/1971 | Humpage | 228/1 |
| 3,647,599 | 3/1972 | Gardner | 156/580 |
| 3,666,602 | 5/1972 | Obeda | 156/580 |
| 3,671,366 | 6/1972 | Miller | 156/580 |
| 3,687,786 | 8/1972 | Williams et al. | 156/580 |
| 3,750,926 | 8/1973 | Sakamoto | 228/1 |
| 3,756,900 | 9/1973 | Michel | 156/580 |
| 3,787,258 | 1/1974 | Takahashi et al. | 156/73 |

*Primary Examiner*—Charles E. Van Horn
*Assistant Examiner*—F. Frisenda, Jr.
*Attorney, Agent, or Firm*—H. M. Chapin

[57]                  ABSTRACT

Apparatus for performing a method for ultrasonically uniting sheets of thermoplastic material comprising the steps of: (a) providing an anvil having a plurality of spaced grooves in a surface thereof; (b) positioning said sheets in superposed relationship on said anvil and covering said grooves; and (c) traversing an ultrasonically vibrating horn across said grooves, and in contact with the area of said superposed sheets which covers said grooves and the surface of said anvil between said grooves. This method is of particular value when an electrically conductive metal coating is to be preserved across the spliced area. Two parallel spaced splices can be performed with a single ultrasonic horn having two pads designed to traverse two rows of grooves simultaneously. The ultrasonic horn should be mounted for pivoting about an axis midway between, and parallel to the rows, to assure uniform contact. The apparatus comprises a motor propelled carriage for the horn adapted for back and forth movement so that successive splices can be made during movements in opposite directions. Tracks at opposite ends of the anvil are provided for wheels to ride on to remove the horn from the work upon completion of a splice.

6 Claims, 6 Drawing Figures

APPARATUS FOR ULTRASONIC SPLICING

This is a division, of application Ser. No. 126,091 filed Mar. 19, 1971 now U.S. Pat. No. 3,728,183 granted Apr. 17, 1973.

BACKGROUND OF THE INVENTION

1. Field of the Invention

The present invention relates to a novel method of and apparatus for ultrasonically uniting sheets of thermoplastic material. More particularly our novel method is directed to uniting sheets of thermoplastic material, at least one of which has an electrically conductive surface, along a selected path in such a way that electrical conductivity from one side of the path to the other is preserved.

2. The Prior Art

The ultrasonic splicing together of sheets of thermoplastic material is well known, as exemplified in many U.S. patents. We have found, however, that when a sheet of thermoplastic material having an electrically conductive surface thereon (eg a film of nickel, aluminum, or silver) is spliced to a second sheet of thermoplastic material by procedures of the prior art, with the electrically conductive surface in contact with the second sheet, electrical conductivity along the splicing path is destroyed and it is then impossible to transmit electricity through the conductive layer from one side of the splicing path to the other.

In prior art splicing procedures, generally a single splicing path is followed at a time. We have found that where more than one path is to be traversed, as in making pockets or pods, this can be done in one operation by using a single ultrasonic horn so shaped and so designed as to splice along two or more parallel spaced paths at the same time, while preserving uniform contact along all paths.

SUMMARY OF THE INVENTION

In its simplest form our invention is a method for ultrasonically uniting two sheets of thermoplastic material by providing an anvil having a plurality of spaced parallel narrow and shallow grooves therein arranged along the desired splicing path or paths and extending transversely thereof. The two sheets to be spliced are positioned on the anvil in superposed relationship covering the grooves, and then an ultrasonically vibrating horn is traversed along the splicing path across the grooves in contact with the area of one of the superposed sheets which covers the grooves. When there are a plurality of similar parallel splicing paths, a single horn can be in contact with all paths. We have found that with this technique a strong splice is secured. Moreover, the continuity of an electrically conductive coating which may be present on one or both of the sheets is preserved, so that electricity can be conducted from one side of the completed splice to the other.

The method described above can be performed by manually traversing the ultrasonic horn across the anvil, but it is preferred to employ motor-driven apparatus which is so designed as to provide continuous movement at the correct speed. Moreover, this apparatus is so designed as to permit a single ultrasonic horn to remain in uniform contact with a plurality of parallel spaced splicing paths when a plurality of spaced splices are to be made with one traverse of the horn.

Generally speaking, such apparatus comprises a single ultrasonic horn having a plurality of projecting bosses or pads thereon corresponding to the spaced splicing paths, a support for the horn, means pivotally mounting the horn on the support for pivotal movement about an axis parallel to the anvil surface and intermediate the two lines of grooves, and mechanism for moving the horn support along the anvil parallel to the splicing paths. The mechanism for moving the horn is reversible so that upon completion of a movement in one direction the spliced sheets can be removed and replaced with the next sheets to be spliced, after which the movement of the horn is reversed to accomplish splicing and then return it to its original position. Alternatively, half a splice can be completed from one side to the middle, then the horn can be moved to the opposite side, the mechanism reversed, and the remainder of the splice completed.

THE DRAWINGS

The details of construction of the apparatus will be described hereafter with reference to the drawings wherein.

THE PREFERRED EMBODIMENTS

Figure 1:
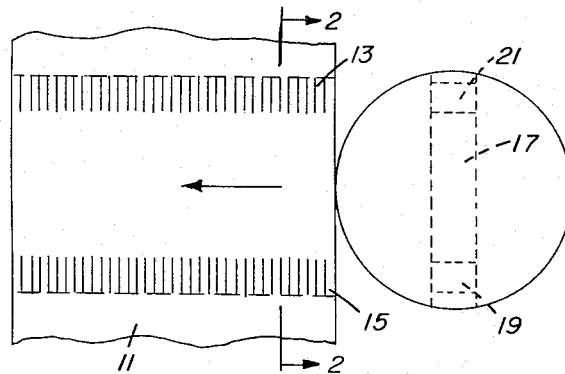
FIG. 1 is a plan view showing an anvil and ultrasonic horn in position to splice superposed sheets along two parallel paths.
Figure 2:
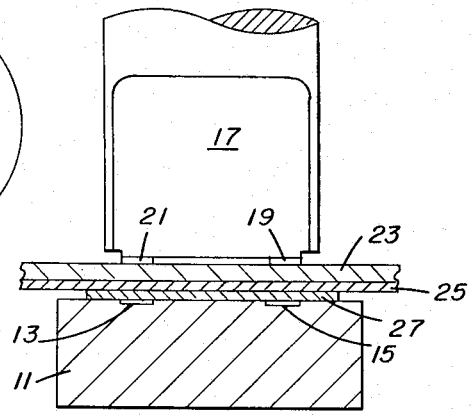
FIG. 2 is a cross-sectional view taken along the line 2—2 in FIG. 1, showing superposed sheets in position to be spliced.

Now referring to FIGS. 1 and 2, there is shown an anvil 11 of hard material such as stainless steel having two parallel spaced rows 13 and 15 of grooves or slots etched into the surface thereof along the two paths where sealing is to be accomplished.

Satisfactory results have been obtained with parallel grooves ⅛ inch long, 0.010 inch wide, and 0.002 inch deep, spaced 0.032 inch apart and normal to the paths, but it is evident that other dimensions and spacings can be employed without departing from the principles of the invention.

An ultrasonic horn 17 having two transversely spaced projecting bosses or pads 19 and 21 on the bottom end thereof is positioned off one end of anvil 11 and is moved across the anvil manually or automatically. Pads 0.218 inch wide with 0.812 inch between, and having a curved surface with a 0.5 inch radius have been used.

Before movement, however, the sheets to be spliced are positioned on the anvil as shown in FIG. 2 wherein a sheet 23 having an electrically conductive coating 25 thereon is positioned on top of a second sheet 27 which is in contact with the surface of the anvil on one side and in contact with the electrically conductive coating 25 on the other side. The sheets can be held down by vacuum orifices or by magnetic strips, as is well known. Then the horn 17, which has been energized by a piezoelectric or magnetostrictive transducer so as to vibrate ultrasonically at between 20 and 40 KHz or even more, is moved continuously across the superposed sheets while the two bosses 19 and 21 are maintained in uniform contact therewith so as to splice the sheets together while maintaining the integrity of the part of electrically conductive coating 25 which is between adjacent grooves.

Figure 3:
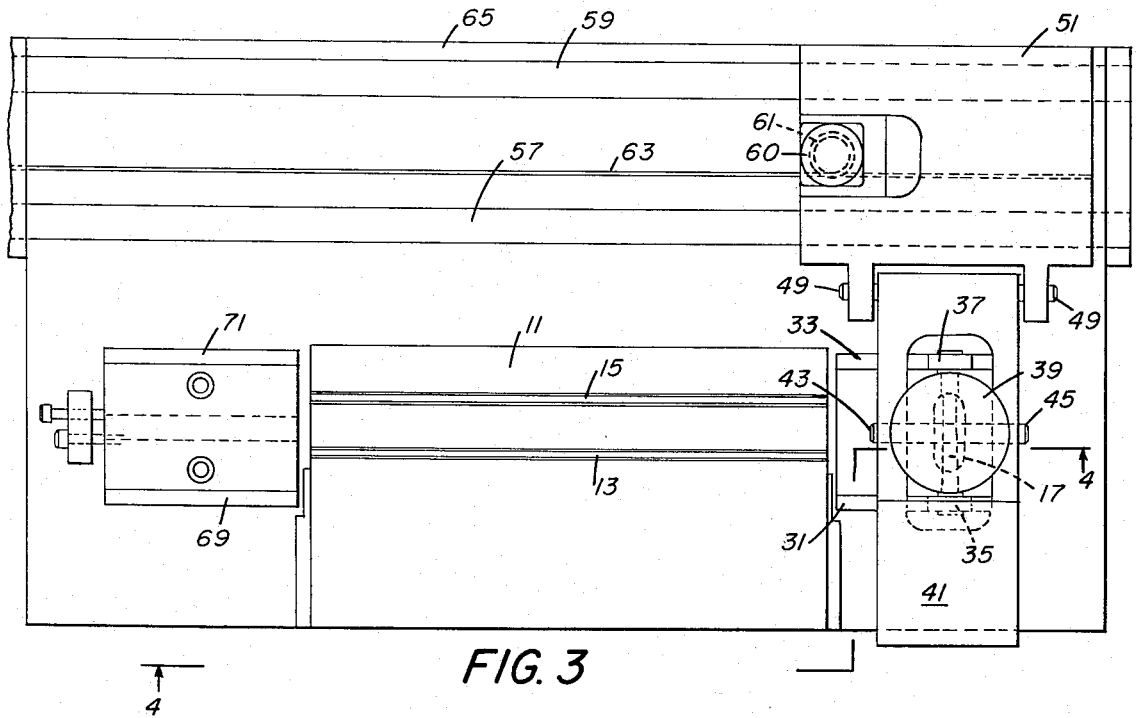
FIG. 3 is a plan view of apparatus for performing the invention by automatically traversing an ultrasonic horn across an anvil.
Figure 4:
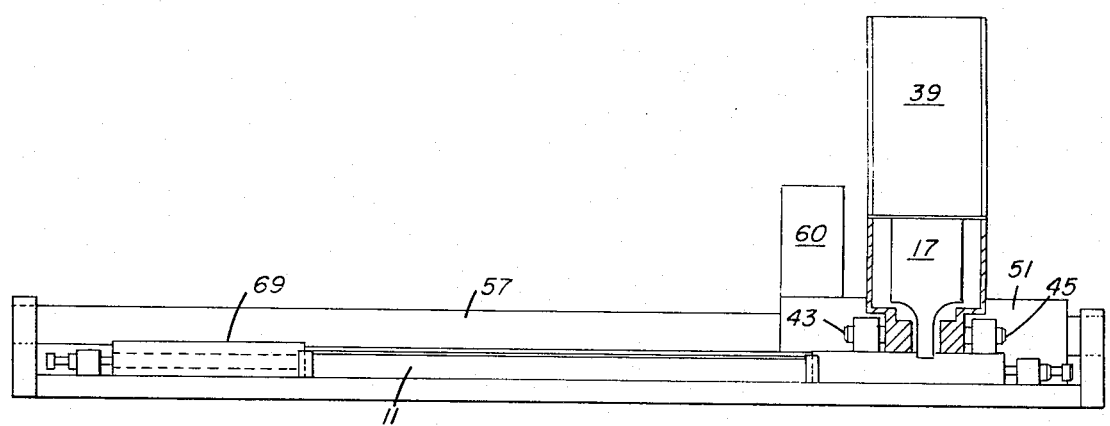
FIG. 4 is a view, partly in side elevation and partly in vertical section, of the automatic apparatus taken along the line 4—4 in FIG. 3.
Figure 5:
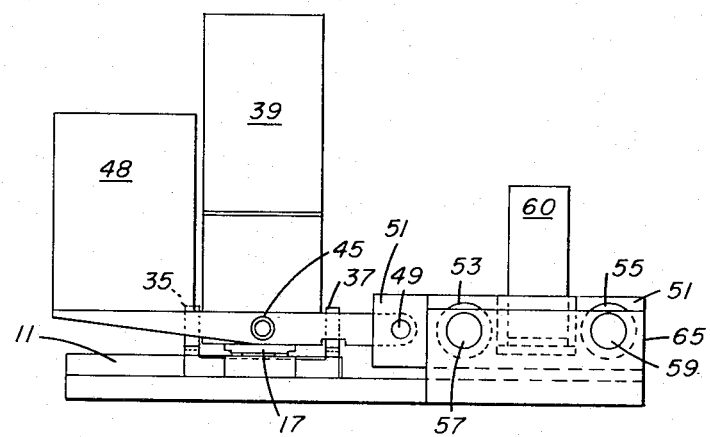
FIG. 5 is an end elevational view of the apparatus as viewed from the right in FIG. 3.
Figure 6:
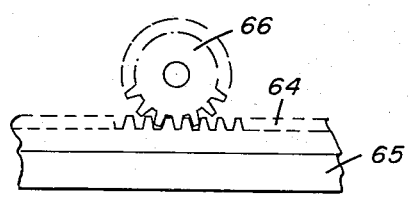
FIG. 6 is a fragmentary plan view showing a rack and pinion drive for the apparatus.

Now referring to FIGS. 3, 4 and 5, the apparatus for automatically splicing sheets together will be described. The anvil 11 is positioned horizontally to receive the sheets to be spliced along the two paths 13 and 15. At each end of the anvil 11 there is provided a pair of transversely spaced tracks which are at a slightly higher level than anvil 11, and have a shallow well between tracks. Tracks 31 and 33 at the right end of anvil 11 support a pair of wheels 35 and 37 which are carried by a cylindrical horn support 39, which in turn carries internally thereof the ultrasonic horn 17. The lower end of the horn projects a short distance below the lower edges of the wheels and below the tracks. Horn support 39 is carried by a transversely extending outrigger 41 on which it is mounted by a pair of pivots 43 and 45 providing an axis passing normally through the center line of the horn to permit slight rocking movement of the horn as it traverses the anvil so as to maintain the two bosses 19 and 21 at all times in uniform contact with the sheets to be spliced, and equally loaded with about 4 pounds of force.

Outrigger 41 carries an appropriate weight 48 on its free end, and is mounted at its opposite end on a horizontal pivot 49 to a carriage 51 off to one side of the anvil 11 and movable parallel to the paths 13 and 15. Carriage 51 has a pair of bores 53 and 55 thereon through which a pair of cylindrical rods 57 and 59 pass so that the carriage can be moved back and forth along such rods.

A motor 60 on the carriage drives a pulley 61 around which is wrapped a wire 63 which is secured at its ends in the ends of a frame 65. Alternatively, (as shown in FIG. 4) a rack and pinion drive can be used, with the rack 64 on frame 65 and the pinion 66 on the shaft of motor 60. Thus, when motor 60 and ultrasonic horn 17 are energized, the horn travels along tracks 31 and 33 and then along the splicing paths 13 and 15, after which the wheels 35 and 37 roll onto tracks 69 and 71 at the opposite end of the anvil. The spliced sheets are then removed and replaced by the next set of superposed sheets, after which the electric motor 60 is reversed and the energized horn 17 passes back to its original position while splicing.

Instead of simultaneously energizing the motor and horn, the former can be first energized, and at the moment the wheels leave their tracks the movement can automatically actuate a control switch for the horn, and vice versa at the end of a splice.

The surfaces of tracks 31, 33, 69 and 71 are slightly higher than the surface of anvil 11, and there is a shallow well between the tracks of each pair, so that upon completion of a splicing operation the wheels engage the tracks and carry the end of horn 17 away from contact with any surface that might damage it. During the actual splicing operation the wheels 35 and 37 are spaced out of contact with the anvil 11 and the thermoplastic sheets, and the end of horn 17 floats across the work in contact therewith.

The one pass splicing operation described above works well with most plastic materials which are relatively hard and stiff, for example poly(ethylene terephthalate) photographic film. When one of the sheets is a material which is relatively soft and pliable, for example polyurethane, the one pass operation may tend to produce a creeping movement which is cumulative so that a bulge may occur at the finish end of the splice. We overcome this by moving the energized horn 17 from a first end of the seam half way across the overlapped sheets to splice half the seam, lifting the horn clear of the sheets and moving it to the second or opposite end of the seam, and then moving the energized horn in the opposite direction to the center of the seam to complete the splice.

The splicing techniques described above can be used with similar or dissimilar thermoplastic materials, and can be employed to produce satisfactory splices whether or not the integrity of an electrically conductive coating is to be preserved. Moreover, while the principles have been described as applied to a splicing operation wherein a horn passes across the top of an anvil it is evident that the principles also can be applied with the anvil and horn in other relative positions such as 180° or 90° to the described positions. Of course, in such other positions the horn would have to be loaded against the anvil by spring pressure or a fluid-actuated piston.

Examples of materials that can be united in this way are thin sheets of polyurethane or nylon joined to a sheet of poly(ethylene terephthalate) having an electrically conductive coating thereon.

The anvil grooves can have a secondary function when vacuum hold-down is employed to retain the sheets in position on the anvil, i.e. they distribute the vacuum uniformly.

The invention has been described in detail with particular reference to preferred embodiments thereof, but it will be understood that variations and modifications can be effected within the spirit and scope of the invention.

We claim:

1. Apparatus for ultrasonically uniting sheets of thermoplastic material comprising, in combination,
    an anvil adapted to support such sheets, said anvil having a support surface having a plurality of spaced grooves therein, said grooves being arranged in a plurality of parallel lines spaced from one another, the grooves of each line being closely spaced and parallel to one another;
    an ultrasonic horn adjacent said anvil in position to be traversed relatively across said anvil and across said grooves, said ultrasonic horn having a plurality of projecting bosses thereon corresponding to said lines; and
    mechanism for effecting relative movement between said ultrasonic horn and said anvil in a direction across said anvil and across said grooves.

2. Apparatus in accordance with claim 1, also comprising
    a carrier for said ultrasonic horn; and
    means pivotally mounting said horn on said carrier for rocking movement about an axis parallel to said anvil surface and between two lines of grooves.

3. Apparatus for ultrasonically uniting sheets of thermoplastic material comprising, in combination,
    an anvil adapted to support such sheets;

a carriage located outboard of said anvil;

mechanism for moving said carriage lengthwise of said anvil;

an outrigger projecting from said carriage laterally toward said anvil, said outrigger being pivotally mounted on said carriage for movement about an axis extending lengthwise of said anvil;

track means at each end of said anvil, said track means having the surfaces thereof spaced higher than the surface of said anvil;

support means on said outrigger adapted to ride along said track means for supporting said outrigger; and an ultrasonic horn carried by said outrigger and projecting below the surfaces of said track means whereby said horn floats along said sheets after said support means leaves said track means.

4. Apparatus in accordance with claim 3 wherein said mechanism is reversible whereby successive sheet-uniting operations are accomplished by movements in opposite directions.

5. Apparatus in accordance with claim 3 wherein said outrigger includes a horn support, and wherein said support means comprises wheel means carried by said horn support.

6. Apparatus in accordance with claim 5, also comprising means pivotally mounting said horn support on said outrigger for rocking movement about an axis parallel to said anvil surface.

* * * * *